June 10, 1947. A. A. BEZOSKY 2,421,921
DEVICE FOR WARMING AND RECONDITIONING BEER
Filed Aug. 20, 1945
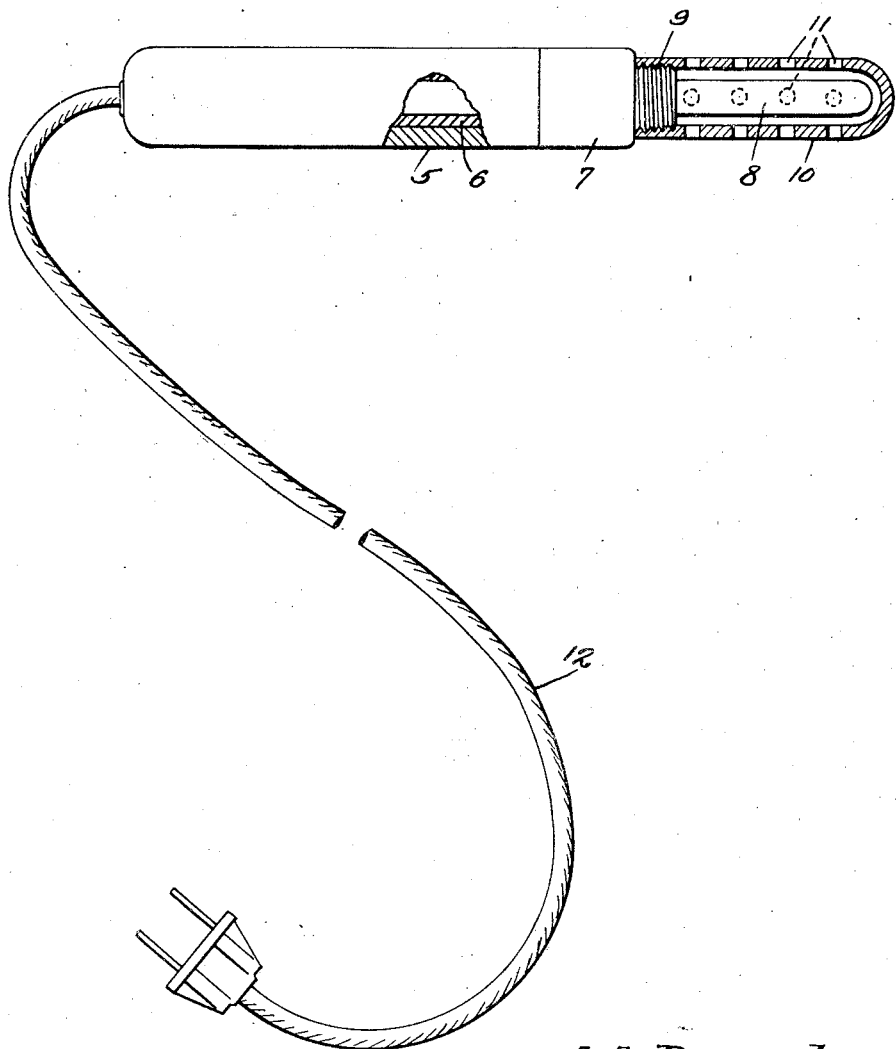
A.A. Bezosky
INVENTOR.
BY
ATTORNEYS.

UNITED STATES PATENT OFFICE 2,421,921

DEVICE FOR WARMING AND RECONDITIONING BEER

Albert A. Bezosky, Myrtle Point, Oreg.

Application August 20, 1945, Serial No. 611,585

1 Claim. (Cl. 219—41)

This invention relates to a device designed for the purpose of reconditioning beer by restoring the head or foam on a glass of beer, when the head on the beer has been destroyed, due to the fact that the beer has become too cold for immediate consumption.

An important object of the invention is to provide a device of this character for use primarily by bartenders in treating flat beer, the device being of the electrical type and of a construction which may be immersed in a glass of beer, tempering the beer and rendering the beer palatable and pleasing to the taste.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing, the figure illustrates a beer heating and tempering device constructed in accordance with the invention, the heating element cover or shield being shown in section.

Referring to the drawing in detail, the device comprises a hollow body portion 5 which is constructed of material to insulate the body portion against electric current passing through the device.

Mounted within the body portion is the tube 6 which is constructed of conducting material, the tube being held in position within the body portion, by means of the sleeve 7 which is threaded on the body portion 5, so that it may be readily removed, should it be desired to remove the tube 6 to facilitate repairs.

The tube 6 is formed with a threaded end, through which the heating element 8 is connected, the heating element being constructed of resistance material, to cause the same to become hot when the electric current passes therethrough.

The heating element is substantially large and is in the form of a rod having a rounded outer end, so that a large heating surface is provided to heat the liquid in which the device is immersed.

The sleeve 7 is formed with a reduced threaded portion 9 that fits into one end of the shield or cap 10 which is constructed of aluminum, the cap 10 being formed with a plurality of lines of openings 11 through which the beer under treatment, passes to contact with the heating element 8.

Electric wires 12 are connected with the tube 6 and these wires are provided with a plug 13 so that the wires may be plugged into the usual house circuit to supply the electric energy for heating the heating element 8.

In the use of the device, the device is plugged into a wall socket and electric energy immediately passes through the heating element 8 which becomes red hot. The device is now positioned or immersed in a glass of beer which has become too cold for the formation of foam or a head, due to the temperature of the beer. The result of the immersing of the device in the beer, raises the temperature of the beer slightly, rendering the beer palatable and at the same time restores the foam or head to the beer.

What is claimed is:

An apparatus for treating liquids, comprising an elongated hollow insulated body portion, a tubular conducting member having a threaded end, fitted within the body portion, an elongated solid heating element secured to one end of said tubular conducting member, a hollow shield positioned over the heating element in spaced relation therewith providing a water circulating space, said shield having a plurality of openings formed therein through which liquid passes for contact with the heating element, and means for directing electric current to said tubular conducting member.

ALBERT A. BEZOSKY.

REFERENCES CITED

The following references are of record in the file of this patent:

UNITED STATES PATENTS

| Number | Name | Date |
|---|---|---|
| 985,344 | Harvie et al. | Feb. 28, 1911 |
| 1,813,270 | Benedict | July 7, 1931 |
| 1,483,564 | Wickes et al. | Feb. 12, 1924 |
| 1,151,403 | Ryce et al. | Aug. 24, 1915 |
| 2,240,953 | Kaye | May 6, 1941 |
| 2,291,367 | Bezosky | July 28, 1942 |